Figure 1:
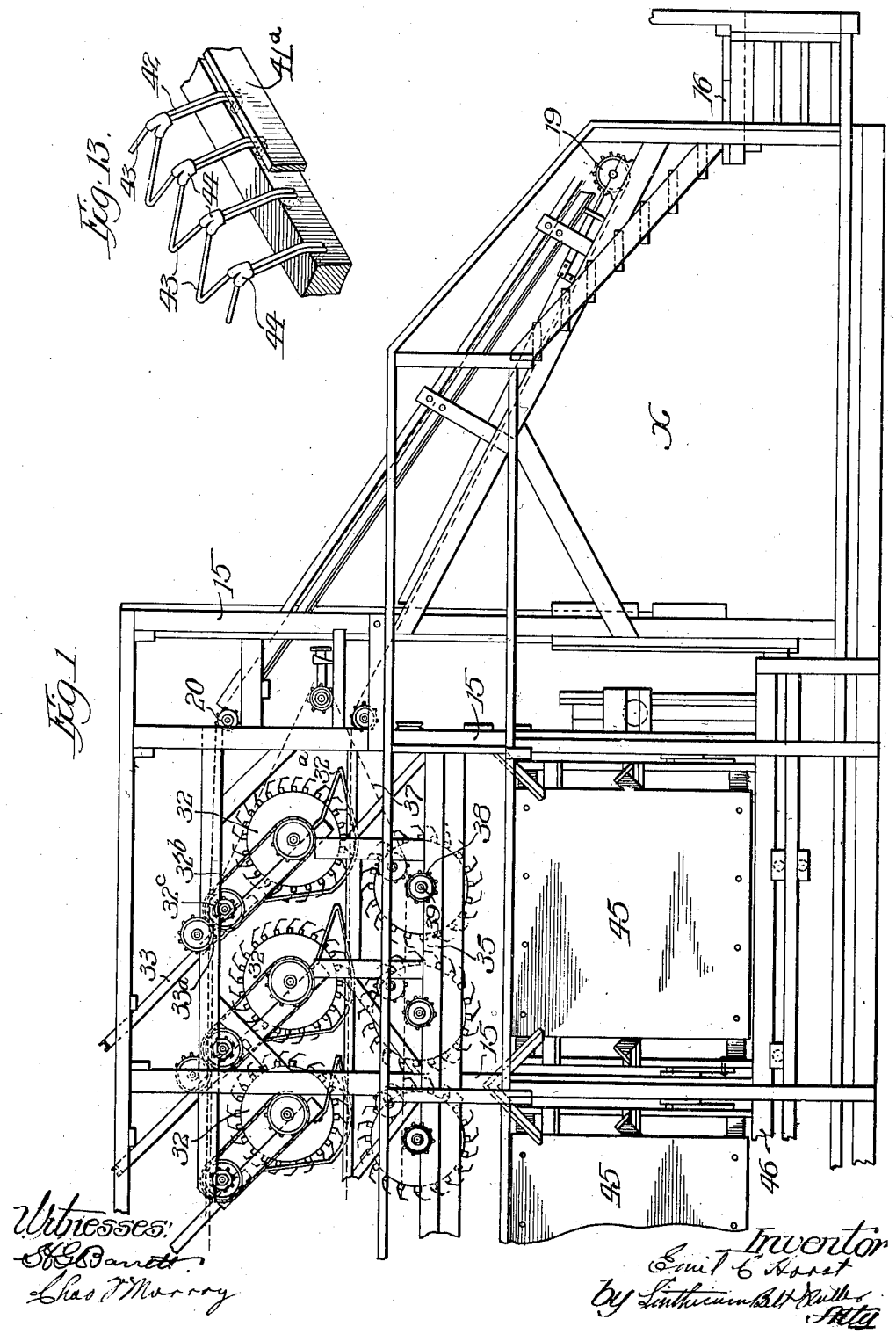

E. C. HORST.
METHOD OF PICKING HOPS.
APPLICATION FILED JUNE 25, 1912.

1,054,551.

Patented Feb. 25, 1913.

7 SHEETS—SHEET 2.

Witnesses:
N. G. Barrett
Chas Murray

Inventor
Emil C. Horst
Linthicum Belt Muller
Attys

E. C. HORST.
METHOD OF PICKING HOPS.
APPLICATION FILED JUNE 25, 1912.
1,054,551.
Patented Feb. 25, 1913.
7 SHEETS—SHEET 3.
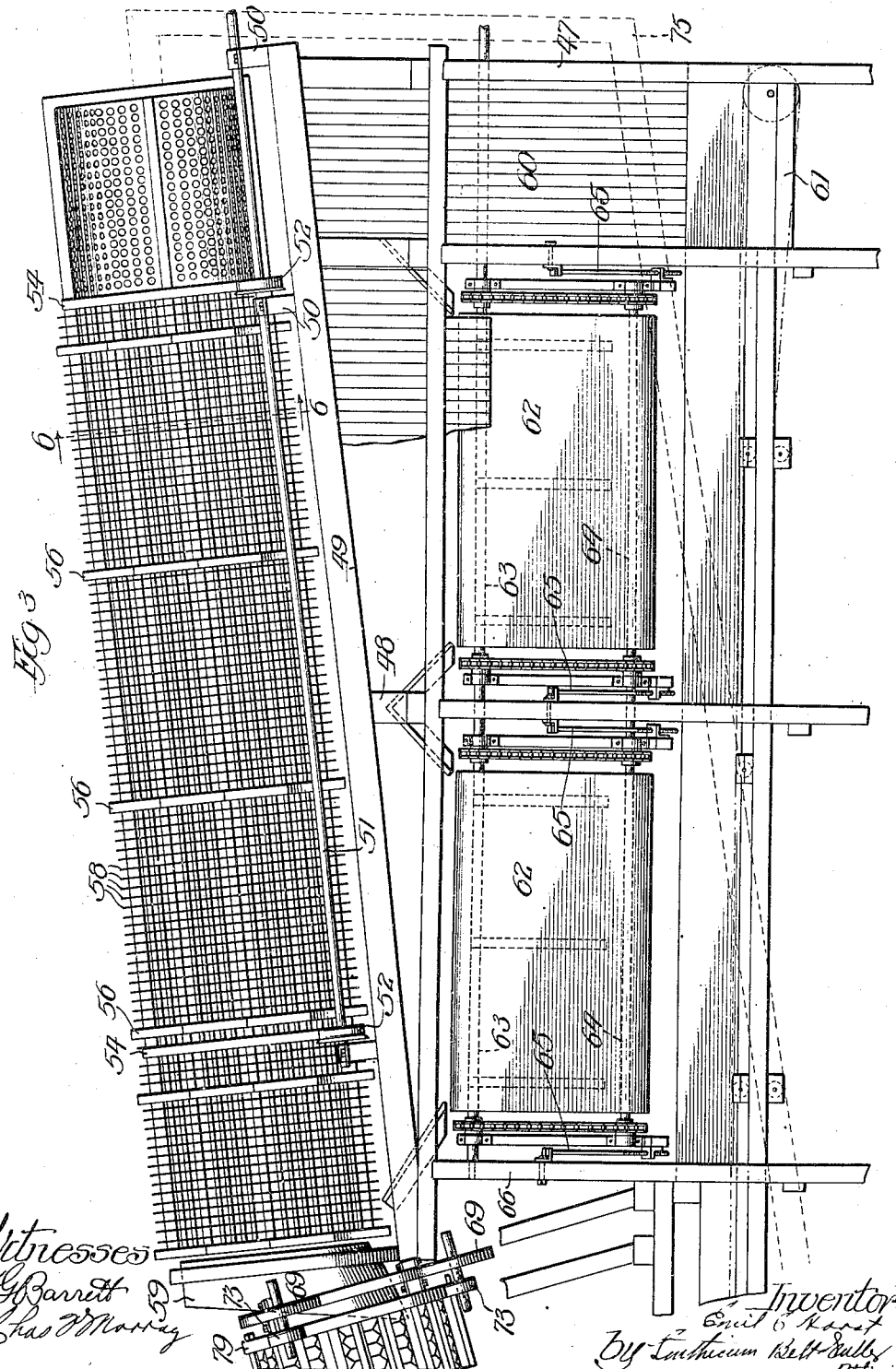

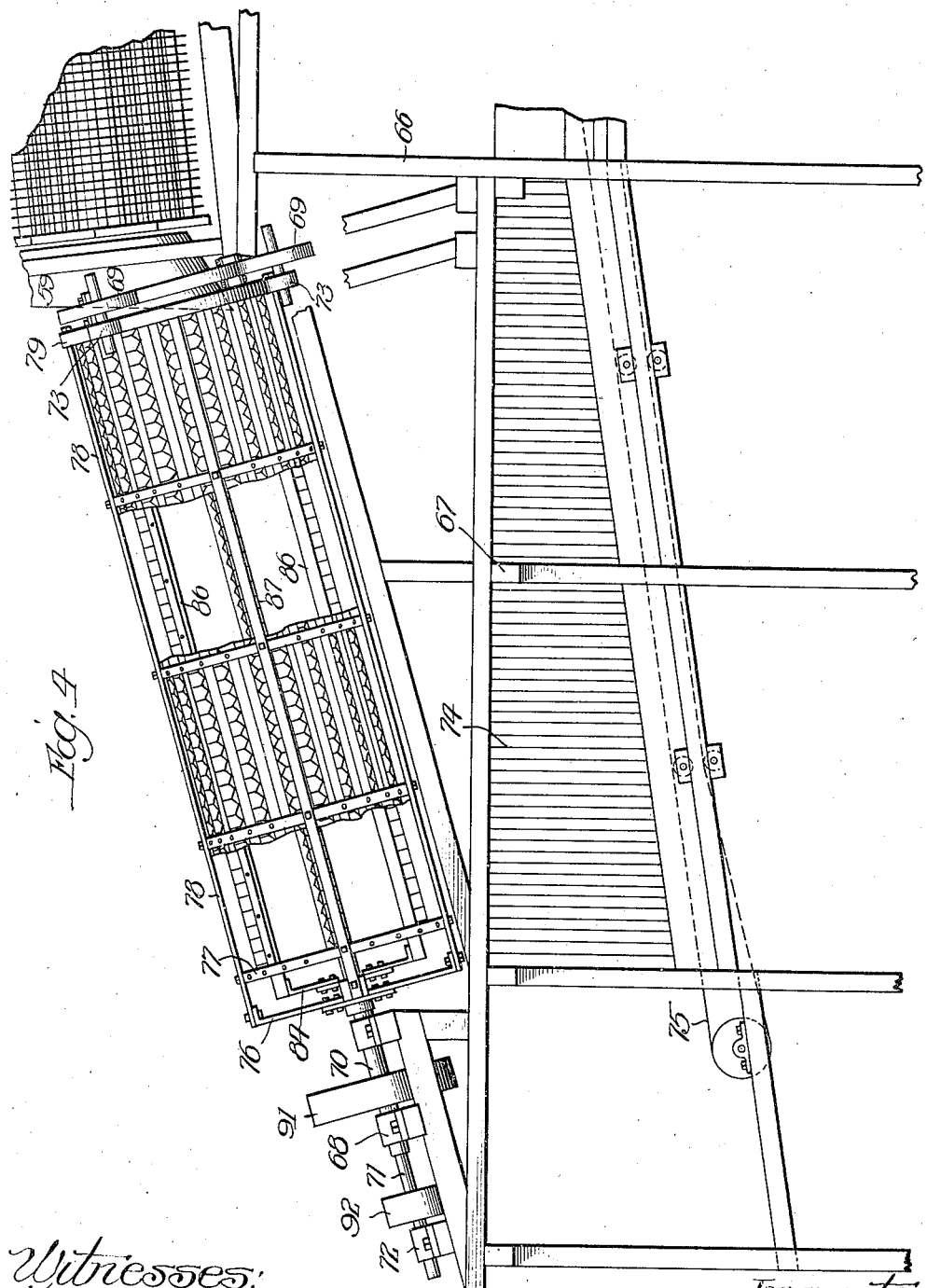

E. C. HORST.
METHOD OF PICKING HOPS.
APPLICATION FILED JUNE 25, 1912.
1,054,551.
Patented Feb. 25, 1913.
7 SHEETS—SHEET 5.
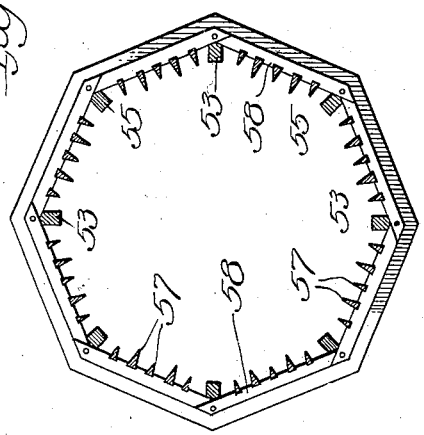
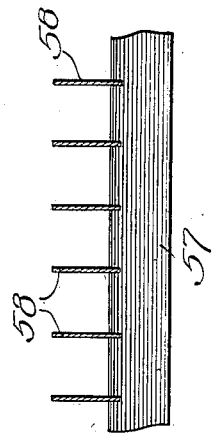
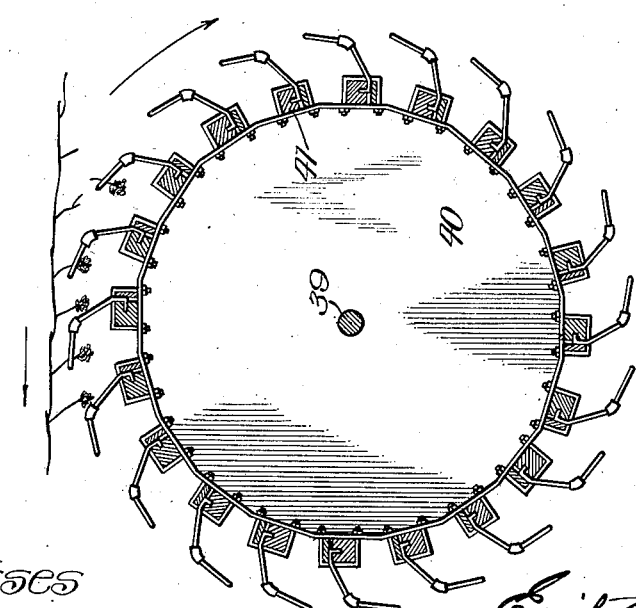
Witnesses
Inventor

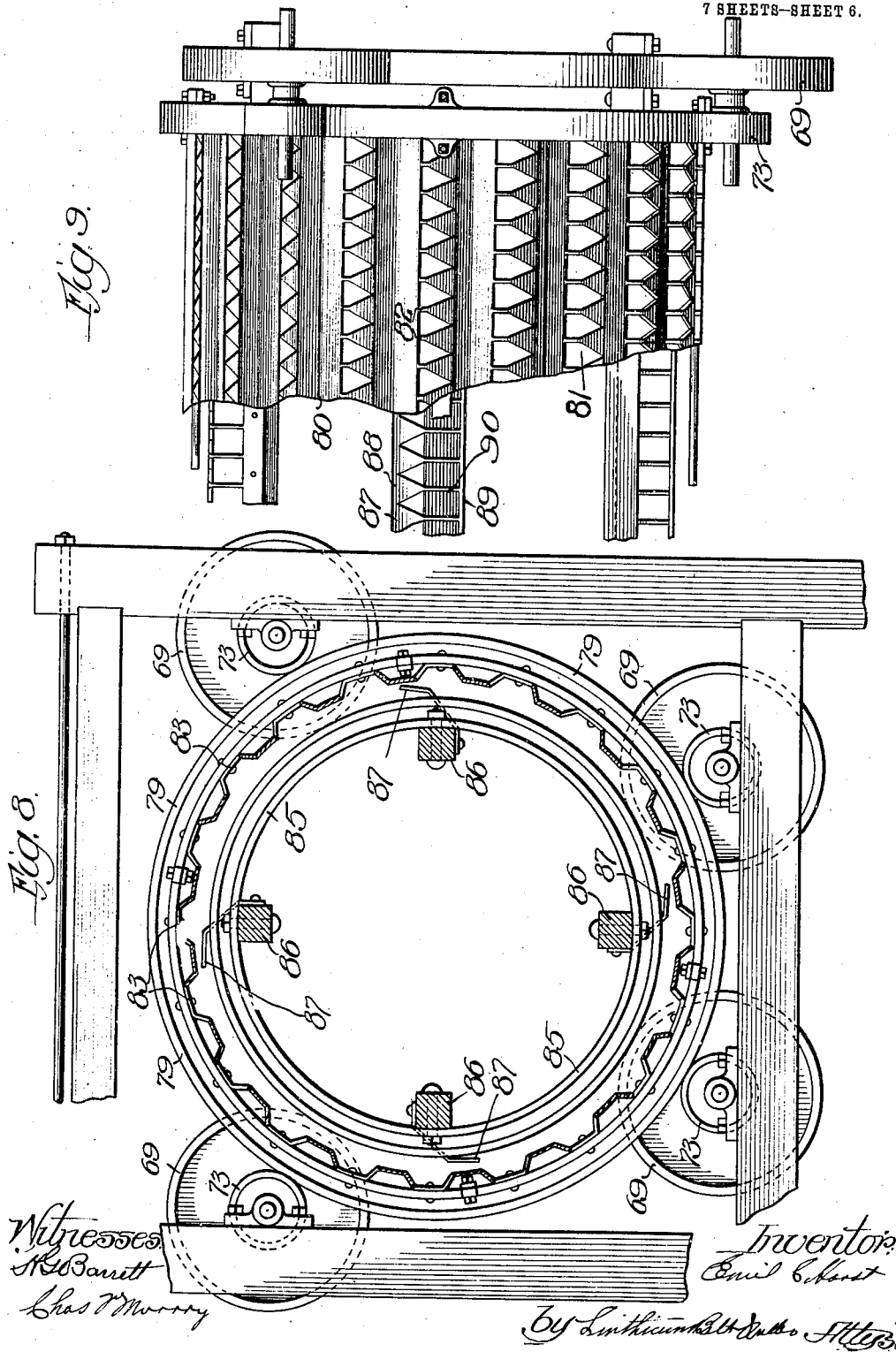

E. C. HORST.
METHOD OF PICKING HOPS.
APPLICATION FILED JUNE 25, 1912.
1,054,551.
Patented Feb. 25, 1913.
7 SHEETS—SHEET 7.
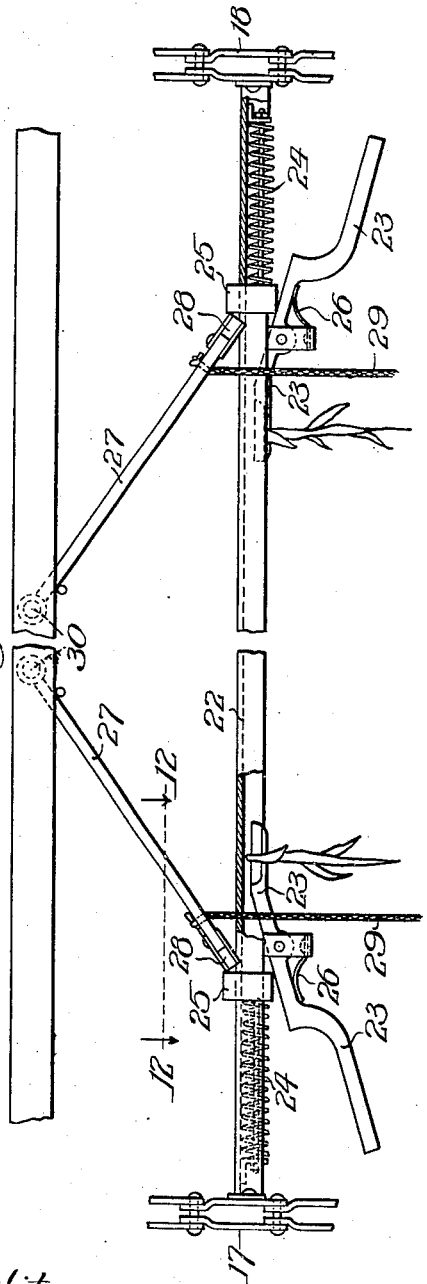
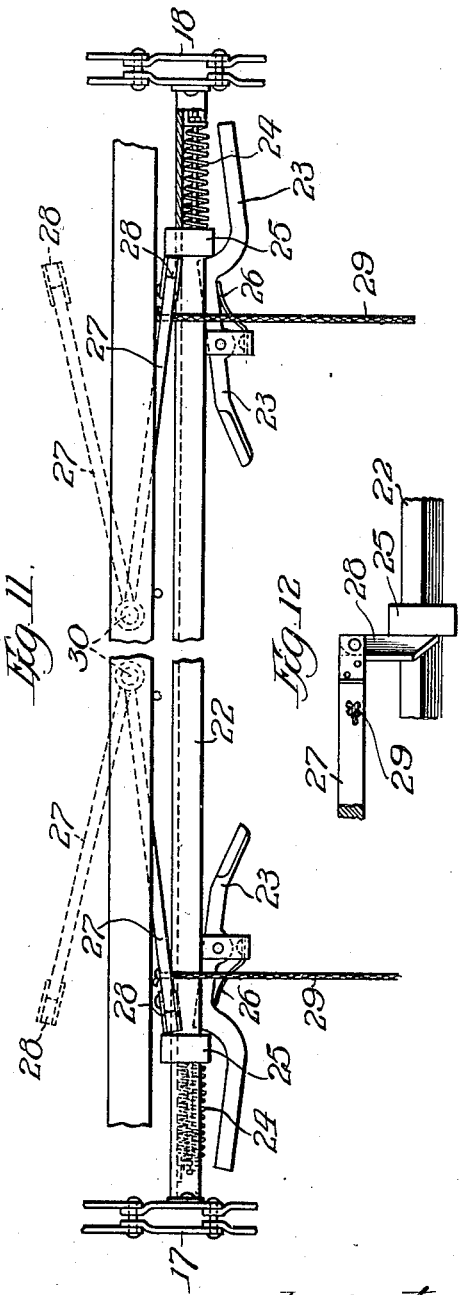

UNITED STATES PATENT OFFICE.

EMIL CLEMENS HORST, OF SAN FRANCISCO, CALIFORNIA, ASSIGNOR TO E. CLEMENS HORST COMPANY, OF SAN FRANCISCO, CALIFORNIA, A CORPORATION OF NEW JERSEY.

METHOD OF PICKING HOPS.

1,054,551.  Specification of Letters Patent.  Patented Feb. 25, 1913.

Original application filed May 25, 1910, Serial No. 563,420. Divided and this application filed June 25, 1912. Serial No. 705,772.

*To all whom it may concern:*

Be it known that I, EMIL CLEMENS HORST, a citizen of the United States, residing at San Francisco, in the county of San Francisco, in the State of California, have invented certain new and useful Improvements in Methods of Picking Hops, of which the following is a specification.

The method of picking hops herein described and claimed was first disclosed in my copending application, Serial No. 563,420, filed May 25, 1910, this application being a division thereof.

Hops are raised on a trellis sixteen to eighteen feet in height. When ripe, the vines are cut about four feet from the ground, the strings supporting their upper ends to the wire or trellis overhead being either broken by pulling on the vines or cut. Prior to my invention hop picking was universally performed by hand. Hand picking, owing to the conditions surrounding the growing of hops, the shortness of the season, scarcity of labor and the like, is very expensive and the best hand picking leaves a large percentage of foreign material in the hops and the necessary sacking, boxing and delay in getting hand picked hops to the dry house often results in the discoloring, bruising and flattening of the hops themselves and entails many objectionable incidents.

My present invention comprises a method of picking hops and I have disclosed in the accompanying drawings apparatus by which my method may be performed.

To the attainment of the desirable results which will be hereinafter more particularly described, the method which I prefer to employ as comprehended in the scope of this application is as follows: First: Passing the hop vines over and in contact with suitable picker mechanism. Second: Depositing the hops by gravity into a suitable conveyer by means of which they are carried to an inclined cylindrical separator. Third: Subjecting any clusters to a further separating action, then causing the hop stems and trash to be elevated and repassed through the separating cylinder just described. Fourth: Finally conveying the hops to the dry house from the combined cleaning mechanism.

A form of apparatus whereby the steps above described may be carried out is disclosed in the accompanying drawings, wherein—

Figure 2:
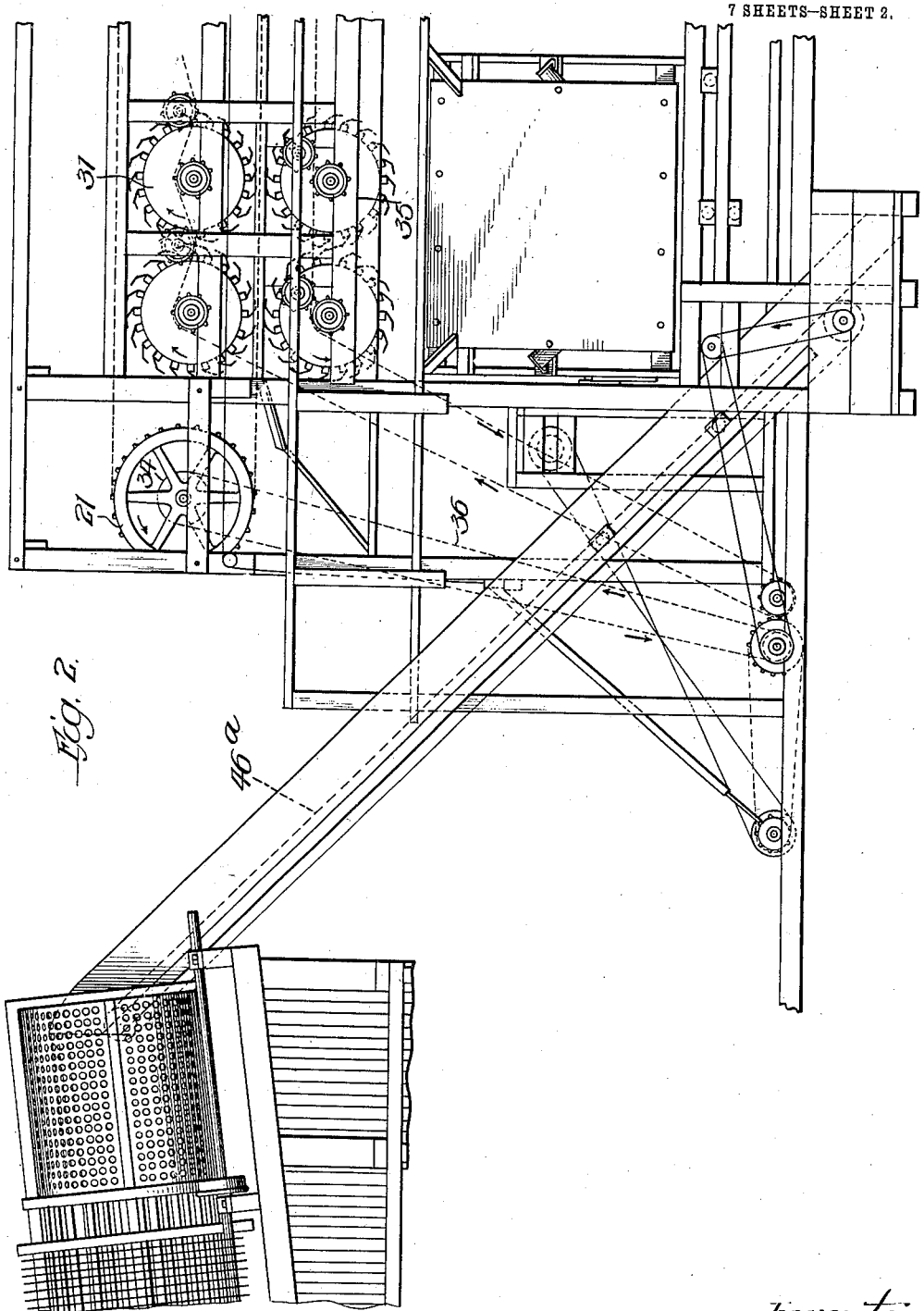

Figures 1 and 2 read together represent a novel hop picking machine in side elevation, with the central portion thereof broken away; Fig. 3 is a side elevation of a hop separating cylinder into which the leaves, hops and trash are directed after leaving the machine shown in Figs. 1 and 2; Fig. 4 is a side elevation of a cluster stemmer into which any stems are directed after leaving the machine shown in Fig. 3; Fig. 5 is a section through one of the hop separating cylinders shown in Figs. 1 and 2; Fig. 6 is a section on the line 6, 6 of Fig. 3; Fig. 7 is an enlarged detail with the means of securing the slats illustrated in Fig. 6; Fig. 8 is an end elevation of the cluster stemmer shown in Fig. 4; Fig. 9 is a fragmentary side elevation thereof; Fig. 10 is a plan view of a vine grasper for use in connection with the machine shown in Figs. 1 and 2; Fig. 11 is a similar view showing the grasper arms released; Fig. 12 is a detail showing the means for automatically releasing the grasper arms; and Fig. 13 is a perspective view of the picker fingers as applied to the picker drum shown in Fig. 5.

I will now proceed to a detail description of the apparatus herein shown by means of which I am enabled to carry out my improved method of picking hops.

Each machine is supported on a suitable framework or supporting structure 15, which in actual practice is from sixty to eighty feet in length, ten feet wide and eighteen feet high. At the receiving end of each machine is a receiving table or platform 16. Extending to each receiving table is an endless carrier composed of a pair of spaced, parallel sprocket chains 17, 18, traveling over suitable direction sprockets 19, 20, at the receiving end and over large sprockets 21 at the opposite end. At suitable intervals, usually about twelve feet apart, these chains are connected by angle bars 22, which constitute a part of the vine grasper. These vine graspers (see Figs. 10, 11 and 12) comprise pivoted members 23, between the inner ends of which and the leg of the angle bar the ends of the vines are clamped, the parts being normally held in clamping relation by means of coiled springs 24 and thrust collars 25. Springs 26 acting on the grasping levers outside their pivots cause them to release the vines when the pressure of the springs 24 is counteracted by the hinged arms 27, which are provided with hinged fingers 28 depending in the path of the collars and held in position to engage them by the counterweighted cables 29. The pivots 30 of the hinged arms being fixed, and the bars 22 continuously moving, the collars will be forced out releasing the graspers, which will then be carried on their pivots, as shown in Fig. 11, releasing the vines and held open until a new vine is inserted, at which time the arms are manually withdrawn from engagement with the spring pressed collar 25. The depending fingers 28 are held against displacement by the squared end of the pivoted rod 27, and are held against movement until the bar 22 has carried the rod 27 to the dotted line position of Fig. 11, when the opposite side of the depending finger 28 will be presented to the bar 22 and will be allowed to spring outwardly, thus releasing it from the member, whereupon the arms 27 will be restored to the position of Fig. 10 by the counterweighted cables 29 ready to engage the collars of the next pair of graspers.

The carrier and vine grasper travel through the machine, over the upper series of fixed picking drums 31 and above the auxiliary drums 32, which latter are mounted on swinging frames 33, for a purpose hereinafter described. The vines are thus drawn, butt end first, over the upper series of drums 31, thence around the reversing drum 34, and back over the lower series of picker drums 35. Power to drive the carrier is supplied to the reversing drum 34 by the belt 36. The several picker drums are rotated in a direction opposite to the travel of the vines by means of sprocket chains 37 passing over sprockets 38 on the drum shafts 39.

Each of the main picker drums is composed preferably of flanged heads 40, mounted to turn with the shafts 39 and a series of transverse slats 41 held to the flanges of the drum heads by U-clips and a series of picker fingers mounted on the slats. The picker fingers are preferably composed of wire, each finger having parallel body portions 42 with bent ends 43 entering openings in the vertical side of the slat and clamped thereto by the bar 41ª, which is also embraced by the clips. The picker fingers are formed as shown in Fig. 13, thus inclosing a V-shaped space open at the rear and closed at the apex, and the adjacent fingers are suitably connected as by the sleeves 44. The specific construction of the picking fingers may be varied, and means for guarding the points thereof to prevent them from penetrating or bruising the hops may be employed. Whatever may be the specific construction of the picker fingers or the material of which they are composed, it is desirable that they should have the V-shape and be open at their receiving sides so that as the drums conveying them are revolved in one direction, as for example clockwise, the vines moving in the opposite direction over the periphery of the drums, the clusters of hops will depend into the path of the fingers and entering their open sides will be drawn into their converging portions and stripped from the vines, the latter, as indicated diagrammatically in Fig. 9, due to their length and the mass of leaves thereon being supported by the revolving surfaces, while the picking fingers engage the depending clusters and strip them. The path of the vines being tangential to the path of the finger, this severing is better performed than if the paths were parallel and entanglement of the vines is prevented.

The vines are turned completely over as they pass around the reversing drum 34, and as they are conducted over the lower set of drums 35, and clusters which were left unsevered by the action of the upper drums will be caught. In this traverse also, any hops which still lie on the upper side of the vines will be likely to contact with the fingers on the lower side of the upper drums and be severed thereby, especially since the action of the drums imparts a vibratory movement to the vines, thus causing all of its branches to come into contact with the picking members and prevents the bunching and twisting of the vines. It will also be observed that the two series of drums are so positioned that their fingers are almost in contact, only sufficient space for the passage of the vines intervening and as the several sets of fingers pass each other tangentially, any hops which may be carried by branches broken or detached from the main vine will be caught and pulled off and any broken vines, clusters of hops or masses of leaves that are caught or entangled in one set of fingers will be removed by the set on the opposite drum passing tangentially thereto, whereby the pickers are made self-cleansing.

The speed at which the main drums are driven may vary with different kinds of hops and usually the drums near the receiving end are preferably driven at a slower speed than those at the opposite end of the machine.

Passing the last of the drums, the stripped stalks are released by the hinged tripping arms at the point X, Fig. 1, beneath the extension of the carrier. The picked hops and the severed leaves and trash, falling from the drums, are received on an inclined chute 45 arranged beneath the drums, and thence into a conveyer trough 46 located parallel to the outside of the machine; the hops, leaves, trash and hop clusters being carried by the conveyer belt and discharged into an octagonal inclined separating cylinder best shown in Figs. 3, 6 and 7.

It will be seen that I mount this machine on suitable vertical supports 47 and transverse supports 48. Angularly positioned members 49 are provided on the framework just referred to and on the members 49 are provided bearings 50 in which are mounted longitudinally extending shafts 51 carrying flanged wheels 52. The shafts may be connected to any suitable source of power. Mounted above the members 49 is the separating cylinder of my invention. The framework of this cylinder is preferably formed of four longitudinally extending bars 53. These bars are bolted to circular iron rings 54, these rings resting upon the wheels 52, the rotation of the cylinder being accomplished by this means. A plurality of shorter longitudinally extending bars 55 are provided, these extending from the upper ring 54 to the lower end of the cylinder. The eight longitudinally extending bars are securely connected by means of octagonal wooden rings 56.

Between the upper metal ring and the upper end of the cylinder, I prefer to place a circular perforated metal cylinder, the perforations being of fairly large size, one to one and a half inches in diameter. The remainder of the cylinder is completed by means of triangularly shaped, longitudinally extending slats 57. These slats as shown in Fig. 6 are of different sizes, that is, I provide three of the smaller size and two of the larger size between each of the longitudinally extending bars 53, 55. The slats are held in place by means of the metal strips 58, which are fitted within sawcuts in one edge of the triangular slats. This is best shown in Fig. 7. The sheet metal strips are also shown in Fig. 3. This cylinder at its lower end terminates in a sheet metal chute 59, non-rotatably mounted on the framework of the machine. Any hops which have not been separated or which are still in clusters pass through the chute 59 into a cluster machine.

Mounted underneath the cylinder heretofore described and particularly beneath the circular perforated metal portion thereof is an inclined sheet metal deflector 60. Any hops passing through the perforations in the sheet metal cylinder fall upon this deflector and pass directly into a clean hop conveyer 61. Also mounted beneath the cylinder and particularly beneath the remaining portion thereof is a belt separator. This separator is composed of an endless strip of material such as burlap or canvas 62, this being passed over rollers 63, 64 at either end. An adjusting bolt 65 is provided in order to adjust the angle of inclination of the separator belt.

The hops and leaves are inserted in the cylinder at its upper end by means of a suitable conveyer 46ᵃ. Many of the hops will fall through the perforations in the sheet metal perforated portion of the cylinder, dropping from there onto the deflector and from there to the clean hop conveyer. The remainder of the hops, leaves and trash pass into the octagonal portion of the cylinder where they are agitated and continually work downward as the cylinder revolves. Single hops and some small leaves continue to fall out through the interstices formed by the triangular wooden slats and sheet iron strips along the full length of the lower portion of the revolving cylinder. The few leaves that do go through the interstices are taken out by the upward traveling separator belts and discharged beyond the same to be removed as rubbish while the clean hops roll down into the conveyer by which they are taken either to kilns to be dried or, as the case may be, to a sacking spout if it is desired to remove the picked hops to drying kilns not contiguous to the machines.

The particular advantage of the triangular slats and the octagonal cross section of the cylinder resides in the fact that the hops, leaves and clusters are continually agitated and prevented from becoming clogged, all the hops being given an opportunity to escape through the interstices.

It has been found in practice that many unbroken clusters of hops pass through the separating cylinder just described, and in order to fully separate these clusters I provide at the lower end of the separating cylinder a hop cluster machine. This machine consists, broadly stated, in two cylinders one rotating within the other and in opposite directions, the two cylinders being mounted at an angle to the horizontal, there being provided on the faces of the cylinder novel forms of picking devices as will be hereinafter described.

In this machine it will be seen that I provide vertical supports 66 and horizontal supports 67 on which are mounted, in suitable bearings 68, the shaft 70 of a cylinder. The upper end of this cylinder is supported by means of a plurality of roller bearings 69 which bearings are mounted on portions of the framework as best shown in Fig. 8. As previously stated, the lower end of the cylinder is supported on the shaft 70 which is hollow in order to accommodate therein a smaller shaft 71 mounted at its lower end in bearing 72 supporting the smaller cylinder provided within the larger cylinder. The upper end of this smaller cylinder is supported on the rollers 73, as best shown in Fig. 8. As will be seen by reference to Fig. 4 there is shown at the upper right hand corner a fragment of the hop separating cylinder just described. A hopper or chute 59 is provided in order to conduct unpicked clusters of hops from the separating cylinder to the cylinders of the present invention.
Provided below the cylinders is an inclined chute 74 terminating in a conveyer 75 for removing the hops and any leaves or trash associated therewith, this conveyer transferring the hops to the upper end of the separating cylinder, best shown in Fig. 3, through which they are again passed.

I will now proceed to the description of the cylinders of my invention.

As shown in Fig. 4, the outer cylinder is composed of an end spider 76 and a plurality of circular rings 77. These are united by longitudinal members 78 and by a heavier metallic ring 79 at the upper end, this ring 79 being adapted for coöperation with the rollers 73 for supporting the upper end. Mounted within the rings 77 and continuous from end to end, I provide a corrugated metal plate 80 having, as shown in Fig. 9, rows of perforations therethrough, these perforations being V-shaped at one side and parallel with the axis of the cylinder on the opposite side as shown at 81. There remains between each perforation a small strip of metal as at 82. As shown, the plate is bent into circular form and corrugated, the outer peripheral portions at each corrugation being perforated and riveted to the rings 77 as at 83. The portions of the corrugations nearest a common center contain the perforations.

The smaller interior cylinder is composed of an end spider 84 and a plurality of connecting rings 85 intermediate of the ends. The upper end, as heretofore stated, is supported on the roller 69. Four longitudinally extending bars 86 are provided, these being bolted to the rings 85 and to these longitudinal members are attached metallic strips 87, which are preferably shaped as best shown in Fig. 9. These strips of metal are perforated and have continuous edges 88, 89, the portion 89 being used for the attachment of the strip to the longitudinal bar 86. In punching the strip a portion 90 is left in order to connect the sections 88, 89. As will be seen by reference to Fig. 9, the openings in the corrugated members 80 and the picker strip 87 are V-shaped and open in opposite directions, therefore, any hops extending through the openings will be picked without crushing. As shown in Fig. 9, these picking openings are provided one for each of the perforations in the length of the outer cylinder, that is, there is no perforation in the outer cylinder which at any complete turn of the two cylinders has not been passed over by a perforation on each of the four longitudinal members 87.

In operation power is applied through the pulleys 91, 92 to rotate the outer and inner cylinders respectively, the outer cylinder revolving clock-wise at preferably ten to twelve revolutions per minute, the inner cylinder revolving counter clockwise preferably at a speed of twenty-five to thirty revolutions per minute. Any clusters of hops which have passed completely through the separating cylinder are discharged into the upper end of the cylinders of the present invention and as they tend to work downward, a portion of the hops depend through the V-shaped openings in the corrugated plate of the outer cylinder and as the inner cylinder revolves, such clusters are picked into individual hops, the corrugations being high enough so that any single hops cannot be broken up by the pickers of the inner cylinder, said single hops soon falling out through the V-shaped openings and deposited into the conveyer 75. A small proportion of leaves and stems may also fall into the conveyer 75 but the larger portion is discharged at the lower end to be removed as rubbish. The hops, and what vines, leaves and stems drop into the conveyer 75 are conveyed back and dumped again into the separating cylinder at its upper end, as shown in Fig. 3. The single hops, stems and leaves that were separated by the action of the present machine are finally separated and conveyed to the kilns.

I claim:

1. The method of picking hops which consists in passing the vine tangentially over picking mechanism and removing the hops without stripping the vine of leaves, then reversing the vine and again subjecting it to picking mechanism, substantially as described.

2. The method of picking hops, which consists in passing the vines over a picker mechanism and in a plane tangent thereto, and then reversing both the position of the vines and the direction of travel, and again passing them over and in contact with the picker mechanism, substantially as described.

3. The method of picking hops, which comprises the steps of passing a hop vine over a picker mechanism, then reversing the vine and passing the same between picker mechanisms, substantially as described.

4. The method of picking hops which comprises the following steps, viz: passing the hop vines over and in contact with suitable picker mechanism, inverting the hop vines during their travel and subjecting them to further picking action, conveying the separated hops, clusters, leaves, and stems to and passing the same through suitable separator mechanism whereby to segregate the hops from clusters, leaves and stems, then subjecting clusters of hops to a further separating action, finally conveying away the cleaned hops, substantially as described.

5. The method of picking hops which comprises the following steps, viz: passing the hop vines over and in contact with suitable picker mechanism, inverting the hop vines during their travel and subjecting them to further picking action, conveying the separated hops, clusters, leaves and stems to and passing the same through suitable separator mechanism whereby to segregate the hops from the clusters, leaves and stems, then subjecting clusters of hops to a further separating action, then passing any such separated hops and stems again through separator mechanism, finally conveying away the cleaned hops, substantially as described.

EMIL CLEMENS HORST.

Witnesses:
CALVIN T. MILANS,
HERBERT S. SHEPARD.